Nov. 24, 1970  A. J. MILLER  3,541,772
FRUIT HARVESTER
Filed Feb. 5, 1969  3 Sheets-Sheet 1
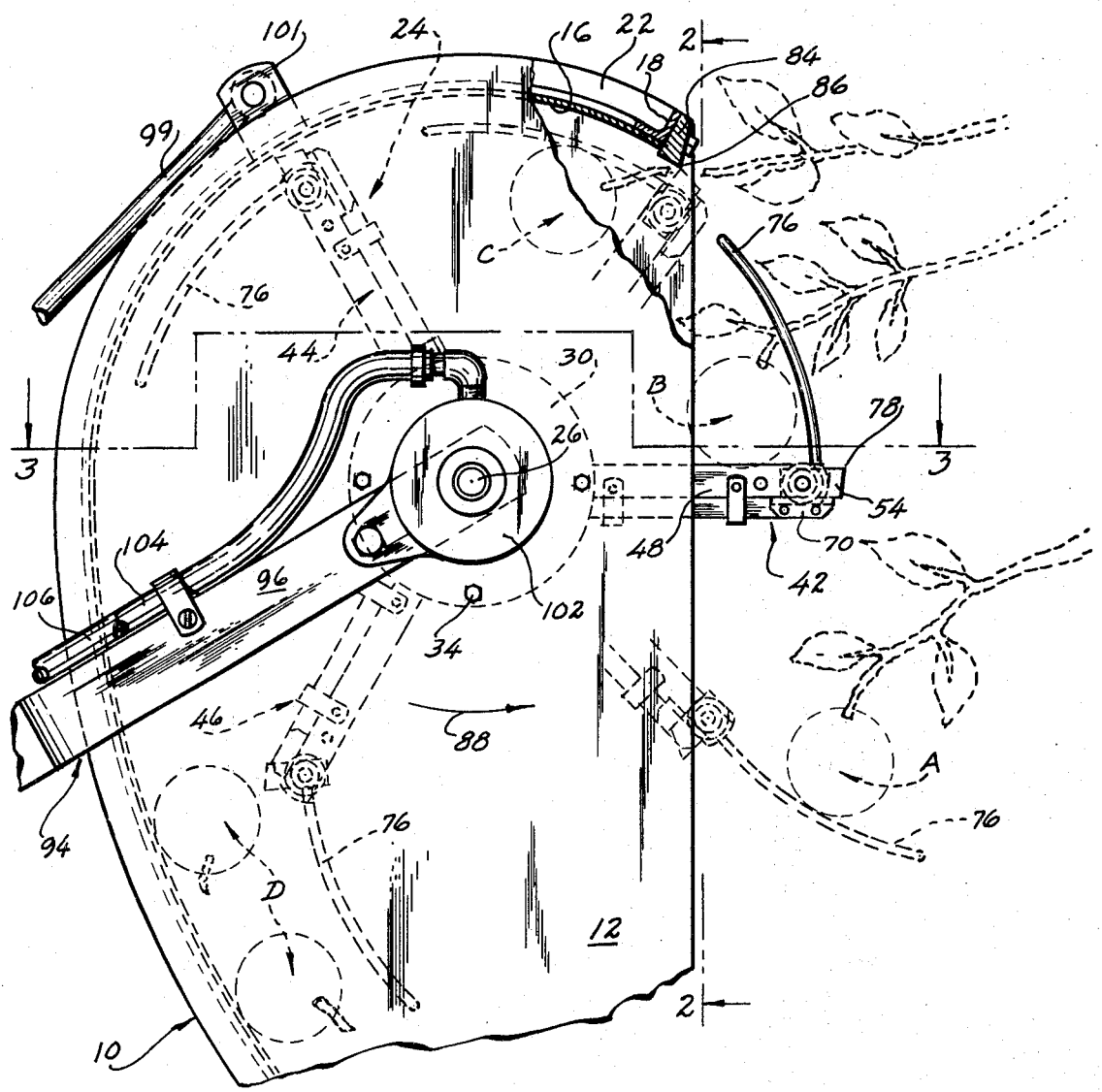
FIG. 1
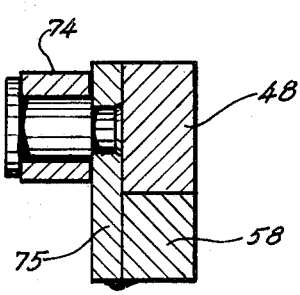
FIG. 5
INVENTOR
ARTHUR J. MILLER
BY

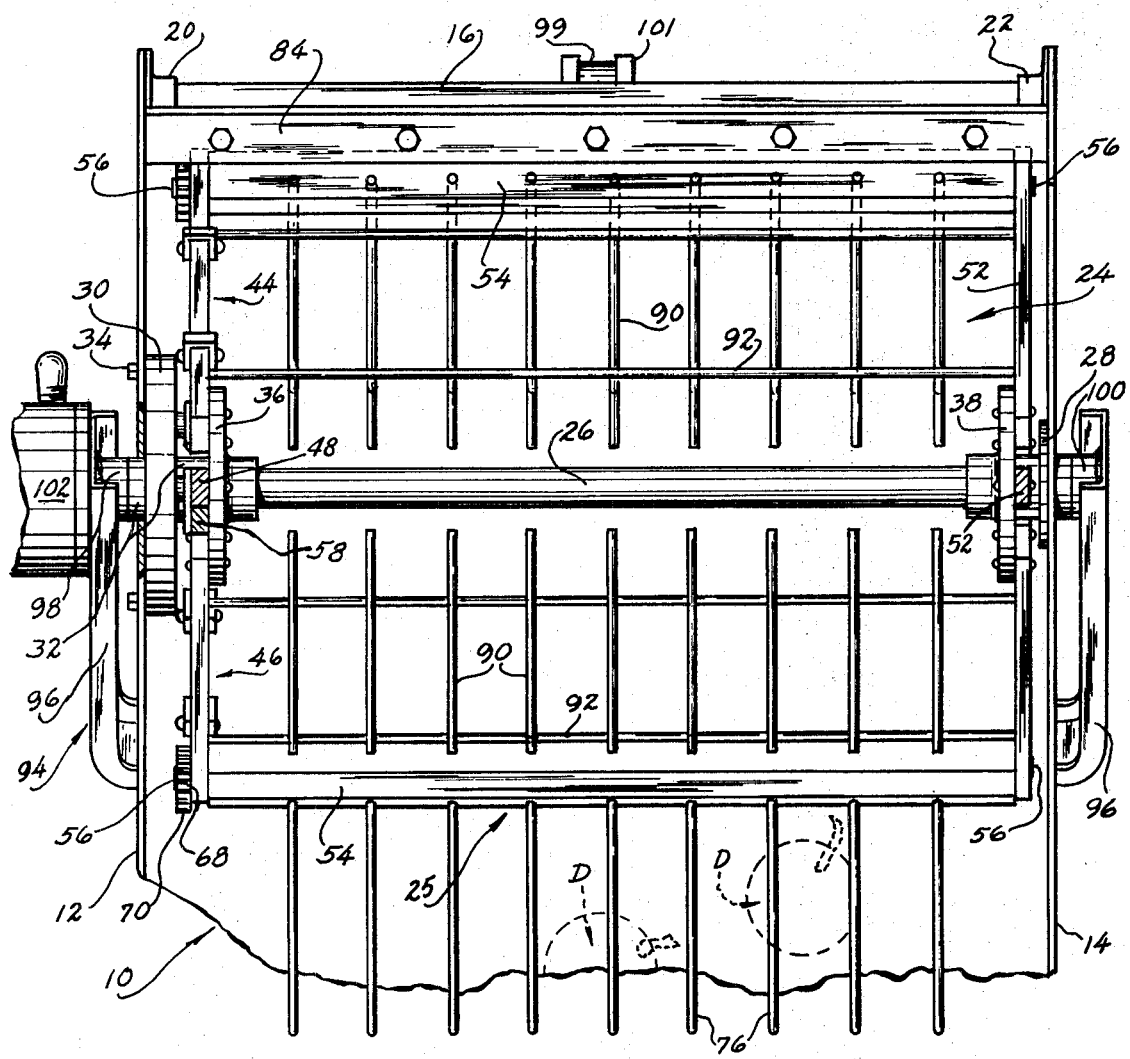
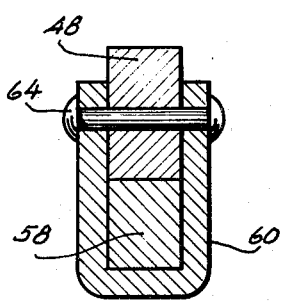
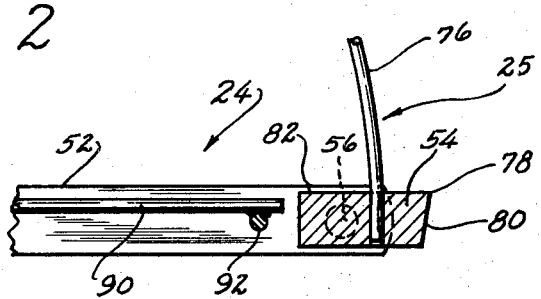

Nov. 24, 1970    A. J. MILLER    3,541,772
FRUIT HARVESTER

Filed Feb. 5, 1969    3 Sheets-Sheet 3

INVENTOR
ARTHUR J. MILLER

United States Patent Office 3,541,772
Patented Nov. 24, 1970

3,541,772
FRUIT HARVESTER
Arthur J. Miller, 2741 S. 76th St.,
West Allis, Wis. 53219
Filed Feb. 5, 1969, Ser. No. 796,867
Int. Cl. A01g 19/00
U.S. Cl. 56—328                      6 Claims

ABSTRACT OF THE DISCLOSURE

A fruit harvester carried by a tractor to pick fruit from a tree, comprising a reel having transversely-extending bars provided with "rake" fingers that engage the fruit. The bars co-operate with a stationary shearing bar to sever the stems of the fruit after it has been gathered by the fingers. Means is provided to "feather" the fingers angularly and normally to the axis of the reel to facilitate gathering, severing and disposing of the fruit.

BACKGROUND OF THE INVENTION

Field of the invention

This invention concerns a fruit harvester which is carried forwardly on a tractor and manipulated to pick the fruit from a tree.

Description of the prior art

Prior art devices of this nature include the type of fruit harvester disclosed in the patent to Lasswell No. 3,197,-952. The Lasswell machine has rotating spindles provided with resilient paddles that engage the fruit in such a manner that the fruit is spun so as to twist it from the stem. The fruit then falls to a bed and then into a receptacle.

SUMMARY

This invention concerns a fruit harvester supported by an arm on a tractor, and comprises a reel having longitudinal circumferentially-spaced pivoted bars. These bars carry axially-spaced rake fingers which function to "rake" the fruit between them. The bars are rotated about their pivots by means of a cam in order to "feather" the fingers during the harvesting cycle. The fruit is first engaged by the fingers, and as the reel rotates, the fruit with its stem still attached, is carried upwardly. A shearing bar is provided which co-operates with the pivoted bars to sever the stem. The severed fruit is carried rearwardly and then falls into a suitable receptacle.

An object of this invention is to provide a tractor-mounted fruit harvester that gathers the fruit and severs it from the twig by cutting the stem.

Another object is to provide a means of gently handling the fruit after severing it, to avoid damage.

Another object is to provide a fruit harvester that will not damage the fruit by removing the calyx or causing damage known as "plugging."

Further objects and advantages of this invention will become apparent from a consideration of the following detailed description taken in connection with the accompanying drawings wherein an embodiment of the invention is shown. It is, however, to be understood that the invention is not limited to the details disclosed, but includes all such variations as fall within the spirit of the invention.

Referring to the drawings:

FIG. 1 is a side view of the harvester with elements of the gathering means also shown in phantom to illustrate the complete harvesting cycle.

FIG. 2 is a front elevational view taken in the direction of 2—2 of FIG. 1.

FIG. 5 is a section taken at 5—5 of FIG. 4.

FIG. 6 is a section taken at 6—6 of FIG. 4.

FIG. 7 is a section taken at 7—7 of FIG. 3.

Figure 3:
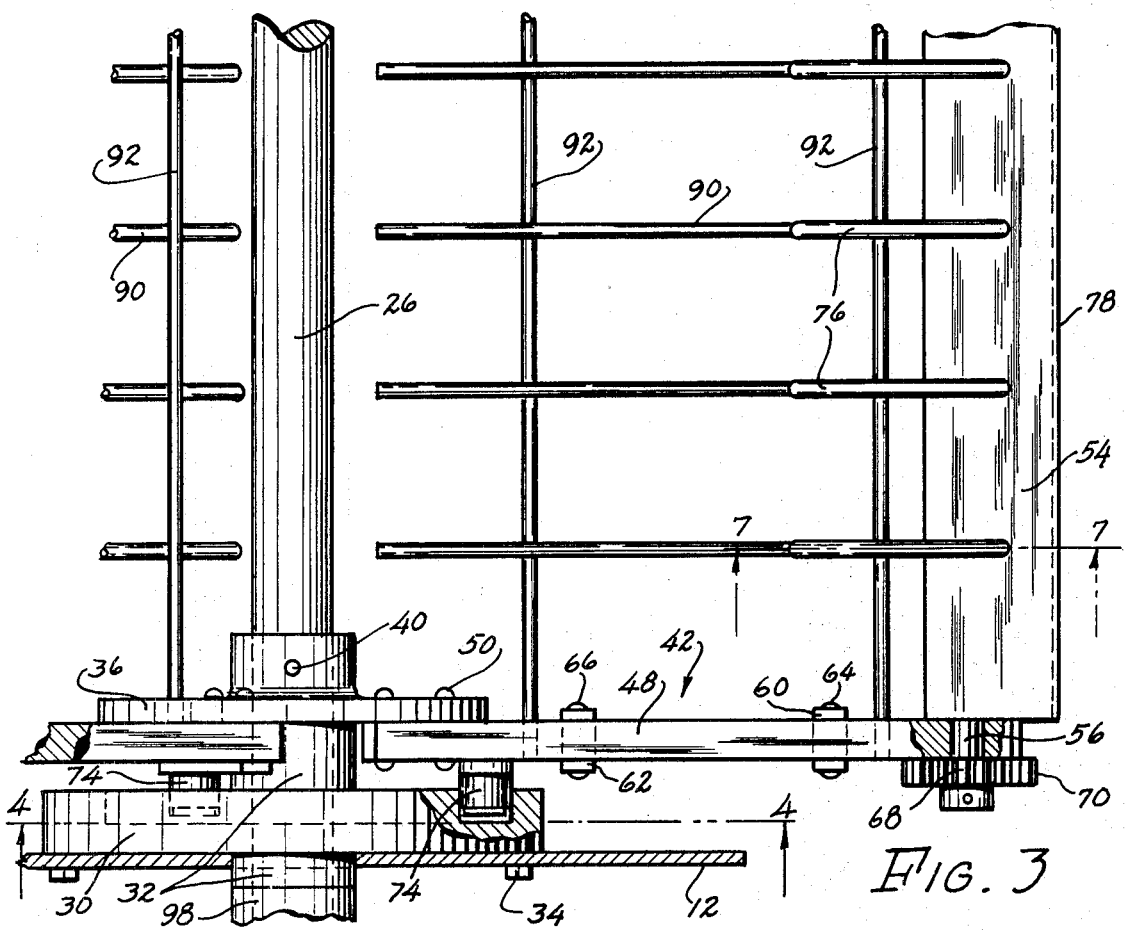
FIG. 3 is an enlarged fragmentary view taken in the direction of 3—3 of FIG. 1.

Referring to FIGS. 1 and 2, the harvester head 10 comprises a frame having end walls 12 and 14 which are of a thickness that will provide sufficient rigidity. A hood portion 16 extends between walls 12 and 14 as shown in FIG. 2. It is within the purview of this invention to provide the hood 16 with perforations to permit the operator to observe the harvesting operation, or to substitute heavy screen material for the hood portion. Hood portion 16 terminates forwardly in an angle member 18. Side angle members 20 and 22 are formed to the contour of hood 16 and provide rigidity for the head 10, and they are also secured to the walls 12 and 14 in any suitable manner, such as by bolting or welding.

The harvester reel 24 is mounted in head 10 and is secured to a shaft 26. One end of shaft 26 is journalled in a bearing flange 28 which is mounted on wall 14 in any suitable manner, the shaft 26 is also journalled in a cam portion 30 by means of a journal portion 32 integral therewith. Portion 30 is supported against rotation in a suitable opening in wall 12 that receives portion 32, and by means of bolts such as 34. The details of cam 30 will be more thoroughly described when explaining the details of reel 24.

Reel 24 comprises axially-spaced flanges 36 and 38 which are secured to shaft 26 by pins such as 40. A rake assembly 25 comprises first radial arms 42, 44 and 46 which extend radially and are identical in detail, so only one such assembly will be referred to, and which is shown enlarged in FIGS. 3 and 4. It is within the purview of the invention to employ one set of first and second arms if so desired. First arm 42 comprises a beam 48 which is secured integrally to flange arm 52 is similarly secured to such as at 50. A second arm 52 is similarly secured to flange 38 at the opposite end of shaft 26 as shown in FIG. 2; one arm 52 being provided for each radial arm 42, 44 and 46. A transversely-extending rake bar 54 is journalled intermediate beams 48 and 52 by means of a journal portion such as 56. A feathering bar 58 is slidably-mounted at one radial face of the beam 48, and is retained in that relationship by means of straps 60 and 62, which are secured to beam 48 by rivets or bolts as at 64 and 66. Journal portion 56 has secured thereto a pinion 68 adjacent beam 48. A gear rack 70 engages pinion 68, and is secured to feathering bar 58 by suitable means.

Figure 4:
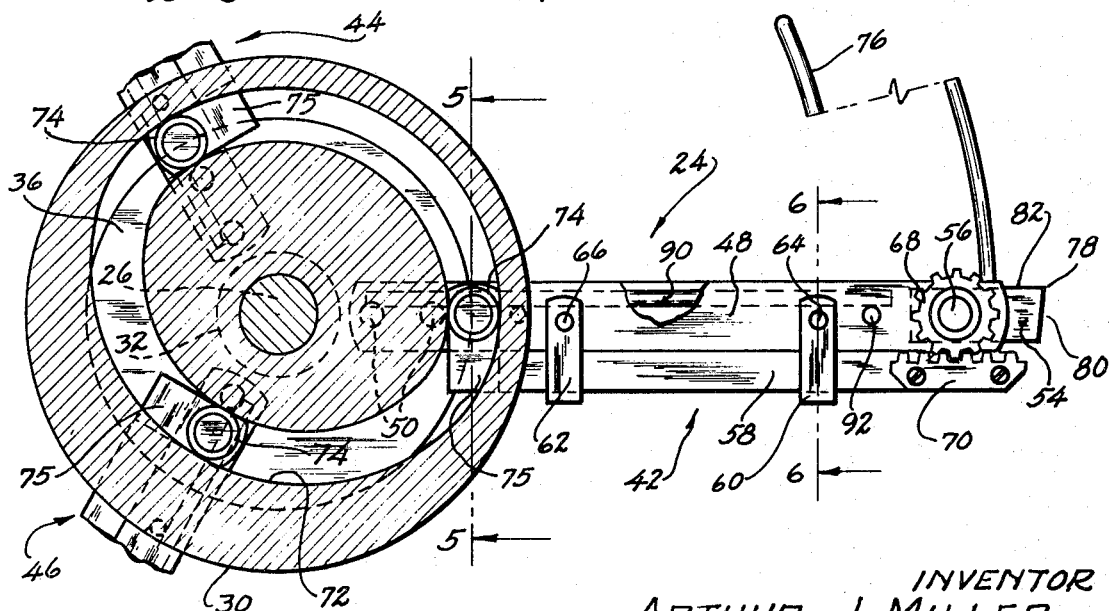
FIG. 4 is a sectional view taken at 4—4 of FIG. 3.

Cam portion 30 is provided with a cam track 72 of the contour shown in FIG. 4. The track conforms to a path which "feathers" the gathering fingers during the harvesting cycle, and which function will be explained later. Rotatable cam rollers 74 travel in the track 72 and are mounted on a strap 75 which is secured to bar 58 by suitable means. Thus, rotation of reel 24 in journal 32 will cause cam rollers 74 to move radially during such rotation, causing rotation of bar 54 about journals 56 by means of pinion 68 and rack 70.

Rake fingers 76 are spaced axially on bars 54 a distance apart less than the diameter of the fruit, to assure that the fruit will not pass between them. Bars 54 are provided with holes to receive the fingers 76 securely, and the fingers are arcuately formed as shown. Bars 54 are provided with cutting edges 78. The trailing face 80 of bars 54 are formed at an angle less than 90 degrees with respect to the face 82 in order to provide efficient severing of the stems of the fruit.

A stationary shearing bar 84 extends transversely of head 10 and has a cutting edge 86 which co-operates with the edge 78 of bar 54 to sever the stems of the fruit as the reel rotates; the direction of rotation being that indicated by arrow 88 of FIG. 1.

A grill comprising rods 90 is provided which are spaced substantially corresponding to the spacing of fingers 76. This grill is mounted between the arms 48 and 52. Rods 92 are inserted in suitable holes in the arms 48 and 52, and provide support for the rods 90 which are secured to the rods 92 in any suitable manner as by welding.

A supporting frame member 94 embraces the head 10 as shown in FIGS. 1 and 2, and comprises side arms 96. Sleeves 98 and 100 provide journals to rotatably support shaft 26, and are welded or otherwise secured to the arms 96. Frame member 94 is suitably mounted upon a tractor and provided with suitable controls to be handled by the operator to position the head in relationship to the fruit to be harvested. A means such as a link 99 extends to the tractor for connection to a suitable control means, and permits rotative adjustment of the head 10 about the axis of shaft 26. A bracket 101 connects link 99 with head 10.

In this instance a hydraulic motor 102 provides the power to rotate reel 24 through shaft 26. Motor 102 is provided with a slip clutch in the event that the reel 24 is prevented from rotating because of a heavy twig failing to cut. A pair of conduits such as 104 and 106 provide the fluid inlet and outlet means to the motor 102.

When this harvester is in operation, the head 10 is elevated to the desired altitude to harvest the fruit, and with reel 24 rotating. The initial engagement with the fruit occurs as at A of FIG. 1, with the fingers 76 lifting the fruit upwardly. When the fruit reaches the position as at B, it rests upon the rods 90. As the fruit, still on its stem, reaches the position indicated as C, cutting edges 78 and 86 co-operate to sever the stem, permitting the fruit to be carried rearwardly as the reel rotates. The fruit finally rolls downwardly on the surface of the hood as shown at D, and then into a container.

The above being a complete description of an illustrative embodiment of the invention, what is claimed as new and desired to be secured by Letters Patent of the United States is:

1. A fruit harvester, for removing stem-supported fruit from a tree, comprising, in combination a frame, a longitudinally-extending reel supported for rotation in said frame about an axis, said reel having a rake assembly comprising at least one pair of axially-spaced, radially-directed first and second arms fixed thereon, a rake bar extending longitudinally intermediate said arms and at the extremities thereof, axially-spaced rake fingers on said rake bar extending substantially in planes normal to said axis and adapted to gather fruit between said fingers during rotation of said reel, and a shear bar fixed to said frame and extending longitudinally co-extensive with said rake bar and to co-operate therewith to sever said stems during rotation of said reel.

2. A fruit harvester as set forth in claim 1, in which said rake bar is provided with longitudinally-extending journals for rotation of said bar with respect to said arms, and means to rotate said bar in response to rotation of said reel.

3. A fruit harvester as set forth in claim 1, in which said reel rotates about said axis on a shaft journalled in said frame, said first and second arms being fixed integrally with said shaft.

4. A fruit harvester as set forth in claim 2, in which said reel has a feathering means associated with one of said arms, said means comprising a feathering bar displaceable radially adjacent said arm, one of said journals and said feathering bar having co-operative means to rotate said rake bar about said journal upon radial displacement of said feathering bar, and means on said frame to impart said radial displacement to said feathering bar upon rotation of said reel.

5. A fruit harvester as set forth in claim 4, in which said means to rotate said rake bar comprises a toothed member fixed on said journal, and a rack bar integral with said feathering bar and engaging said toothed member, a cam member on said frame about said shaft, and means co-operating with said cam member and said feathering bar to impart radial displacement to said feathering bar to effect rotation of said rake bar upon rotation of said reel.

6. A fruit harvester as set forth in claim 5, in which said reel comprises a plurality of said rake assemblies spaced peripherally about said shaft.

References Cited

UNITED STATES PATENTS 3,138,912   6/1964   Mays et al. _____ 56—328
3,468,112   9/1969   Landgrebe _____ 56—330

ROBERT PESHOCK, Primary Examiner